United States Patent [19]

Hockenbrock et al.

[11] 4,405,949
[45] Sep. 20, 1983

[54] LIQUID COOLING IN PROJECTION CATHODE RAY TUBES

[75] Inventors: Richard L. Hockenbrock, Mundelein; Paul Strauss, Chicago, both of Ill.

[73] Assignee: Zenith Radio Corporation, Glenview, Ill.

[21] Appl. No.: 360,741

[22] Filed: Mar. 22, 1982

[51] Int. Cl.³ .............................................. H04N 5/74
[52] U.S. Cl. .................................... 358/237; 358/242
[58] Field of Search ................................ 358/237, 242

[56] References Cited

U.S. PATENT DOCUMENTS 2,188,661  1/1940  Knoll ................................. 358/237
2,342,778  2/1944  Wolff ................................. 358/237
4,274,110  6/1981  Lehnert ............................. 358/237

OTHER PUBLICATIONS

A New Coolant-Sealed CRT for Projection Color TV by: Masahiro Kikuchi, Katsumi Kobayashi, Tomosuke Chiba and Yasumoto Fujii, Jun. 4, 1981.

Primary Examiner—Howard Britton

[57] ABSTRACT

Cooling means are disclosed for cooling the face panel of a projection cathode ray tube. The cooling means comprises a housing having a rearwardly extending flange with a forwardly tapering section configured to nest with the forwardly tapering section of the face panel when mated therewith. The housing has a window section for framing and passing the image formed on a cathodoluminescent screen on the inner surface of the face panel. Spacing means are provided for spacing the window section of the housing from the face panel window section, and bonding means provide for bonding and hermetically sealing the tapering sections together. A cooling medium is located in the space between the windows for cooling the face panel. The tapering sections provide for mechanically attaching the housing and the tube into firm exact adjacency for sealing, in conjunction with the bonding means, the housing to the face panel, and for physically supporting the tube in conjunction with mounting ears in the corner regions of the housing.

4 Claims, 10 Drawing Figures

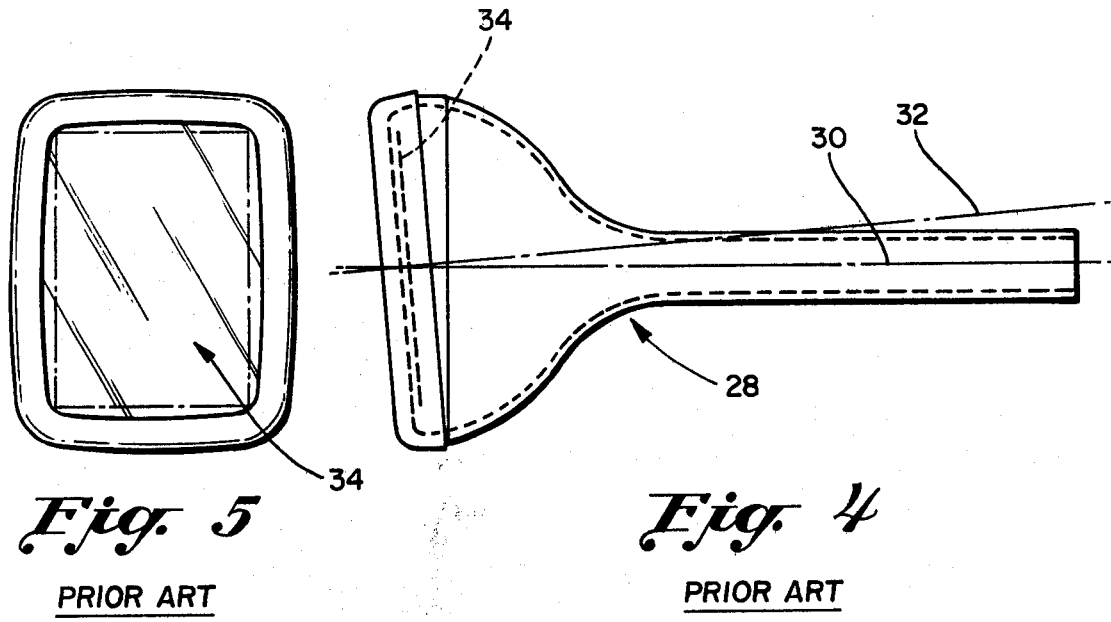
*Fig. 5*
PRIOR ART
*Fig. 4*
PRIOR ART
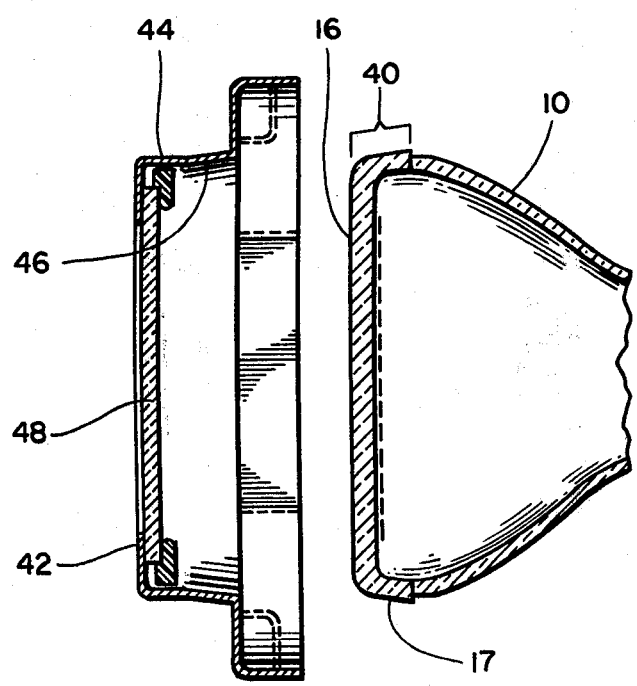
*Fig. 8*

LIQUID COOLING IN PROJECTION CATHODE RAY TUBES

BACKGROUND OF THE INVENTION AND PRIOR ART STATEMENT

This invention relates to cathode ray picture tubes used in projection television systems, and is particularly concerned with means for optimizing the performance of such tubes.

Projection television systems typically include at least one cathode ray picture tube having a cathodoluminescent screen on the inside surface of the face panel. Electron-beam generating means disposed on the cathode ray tube electron-optical axis provide for forming an electron image on the cathodoluminescent screen. This electron image is converted to a visible image by the screen. Projection lens means on the projection optical axis of the tube provide for projecting the aerial image of the visible image onto a viewing screen whereon the viewer sees the television picture. The viewing screen may be of the front-projection type, or of the rear-projection type wherein the aerial image is projected onto the side of the screen opposite the viewer. To provide for compactness of the projection system, the path of the aerial image is normally "folded" by means of one or more mirrors.

Projection television systems may have a bank of red, green and blue image source means including three cathode ray picture tubes each with an associated projection lens for projecting into coincidence a red, green, and blue image to form a composite color image on the viewing screen.

A desirable—indeed necessary—feature of a projection television system is the ability to project an image of adequate brightness on the viewing screen. Brightness preferably should be equal to that of the typical shadow mask color picture tube which provides an average brightness of 80 foot-Lamberts at a beam current of 1.5 milliamperes, and with a peak brightness potential of about 320 foot-Lamberts. In view of the relatively long projection path and consequent effect of the inverse-square law, this brightness objective has proved difficult to achieve in projection television systems.

The face panel of a cathode ray picture tube used in projection television systems can be circular, with a diameter of about six inches. Alternately, the face panel can be of rectangular configuration, with dimensions of approximately 4.5 inches in height, and 5.5 inches in width, by way of example. The visible image that is electron-formed on the cathodoluminescent screen on the inner surface of the face plate is a rectangle of three to four aspect ratio. To provide a projected image of four feet in diagonal measure having a brightness of eighty foot-Lamberts, for example, the brightness of the image on the cathodoluminescent screen of the projection tube must be in the range of eight thousand to nine thousand foot-Lamberts.

An undesired byproduct of image brightness of this magnitude is the undesirably high temperatures which are developed in the tube envelope, especially in the face panel area, as a result of the electron bombardment of the face panel. For example, the operating temperature of the surface of the panel may vary between 80 degrees Centigrade and 90 degrees Centigrade with 85 degrees Centigrade being considered a practical limit at room ambient. As the cathode ray tube envelope is made of glass, the envelope is prone to thermal cracking at higher temperatures, especially in the area of the imaging screen of the face panel where the temperature differential is greatest.

One way to obviate the thermal cracking tendency is to reduce the power consumption of the cathode ray tube from an optimum fifteen watts, for example, which provides a projected picture of acceptable brightness, to about eight watts, wherein the projected picture exhibits a marginally acceptable brightness. This obviously self-defeating measure has proved necessary in some prior art projection systems to provide an acceptable operating life.

So a major factor in limiting the brightness of a projection television system is the thermally induced cracking of the face panel.

Even if the face panel does not actually crack as a result of heat, the high temperatures concentrated in the small imaging area can produce other undesired effects. For example, high face panel temperature can affect the associated projection lens, which is normally located closely adjacent to the face panel. The composition of such a lens is usually a plastic which provides the benefits of light weight and lower cost; however, the plastic is heat deformable. If the face panel reaches temperatures in the 90–100 degrees Centigrade range, the plastic may deform and destroy the focusing properties of the lens.

High face panel temperatures can produce another undesired effect known as "thermal quenching," wherein the light output of the phosphor falls off with increase of temperature beyond a certain limit. Elevated temperatures adversely affect the light output of both the green-light-emitting and the red-light-emitting phosphors, with the condition being particularly acute with respect to the green phosphor.

A coolant-sealed cathode ray tube for projection color television was disclosed by Sony Corporation at the IEEE Chicago Spring Conference on Consumer Electronics, June 4, 1981. The CRT front panel is composed of two flat glass plates, one for the face panel and one for the screen panel. A mixture of ethylene glycol and water is sealed between the two panels, making cooling contact primarily with that part of the face panel through which the image passes, and with the immediately adjacent area. The face panel and screen panel are held in relative adjacency by a cast aluminum bracket which also acts as a separator for the two panels. A temperature-vulcanized silicone is used as a sealant and for bonding the panels to the bracket. The benefit attained is said to be a lowering of face panel temperature by as much as 20 degrees Centigrade during operation.

OBJECTS OF THE INVENTION

It is a general object of this invention to provide means and method for implementing the brightness of the projected image of projection television systems.

It is a less general object of this invention to provide for reducing the operating temperature of face panels of cathode ray tubes used in projection systems.

It is a more specific object of the invention to provide for making possible the use of plastic projection lenses in high-brightness projection television systems.

It is a specific object of the invention to provide for limiting face plate operating temperature to approximately 85 degrees Centigrade at 15 watts continuous operating power.

It is another specific object of the invention to provide means for increasing the power-handling capability of present projection tubes by as much as 80 percent.

It is yet another specific object of the invention to provide electrically conductive cooling means for eliminating dust-attracting static charge build-up.

It is a further specific object of the invention to provide cooling means having provision for X-ray shielding.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIGS. 4 and 5 are, respectively, a sectioned side view, and a view in elevation of the face panel, depicting the actual configuration of the tube shown diagramatically in FIG. 3;

FIG. 6 is a sectioned side view in elevation of a cathode ray tube having cooling means according to the invention;

FIG. 7 is a view in elevation of the face panel section of the FIG. 6 tube; and

FIG. 8 is a view similar to FIG. 6 but with the cooling means according to the invention exploded from the tube face panel;

DESCRIPTION OF THE PREFERRED EMBODIMENT

Figure 1:
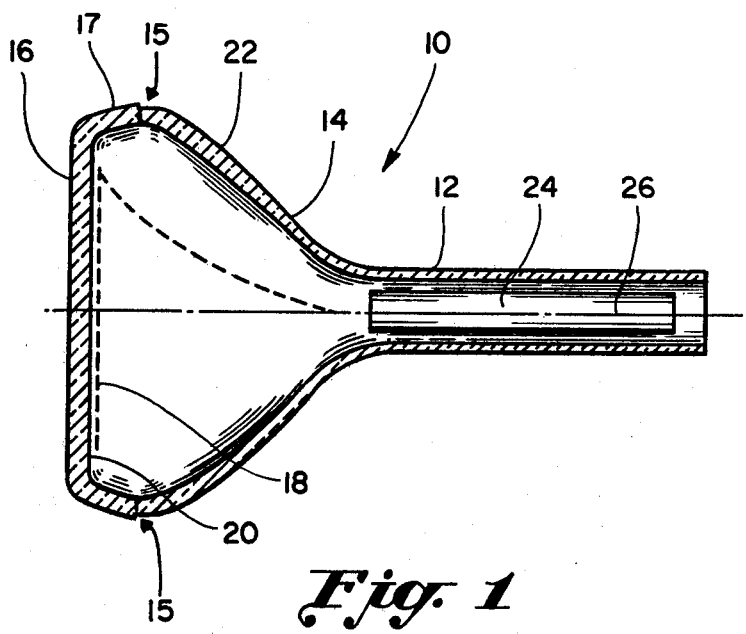
FIG. 1 is a sectioned side view in elevation of a projection cathode ray picture tube having a rectangular face panel.
Figure 2:
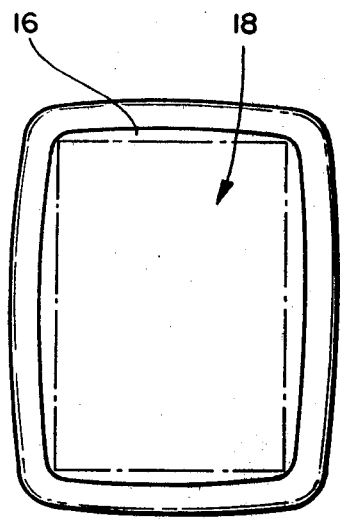
FIG. 2 is a view in elevation of the face panel of the tube shown by FIG. 1.

FIGS. 1 and 2 depict components of the glass envelope of a cathode ray tube 10 for a projection television system. Tube 10 consists essentially of a neck 12, a funnel 14, and a rectangular face panel 16 having a rearwardly extending flange 17. Funnel 14 is joined to face panel 16, with the juncture indicated by seal line 15. Face panel 16 is indicated as having deposited thereon a cathodoluminescent screen 18 on the inner surface thereof for forming a television image. The cathodoluminescent screen 18 is depicted as having an aspect ratio of three to four, and its dimensions are preferably about three inches by four inches, providing a picture imaging area with a diagonal measure of five inches.

The screen 18 is indicated as comprising only a part of the inner surface 20 of face plate 16; in actuality, the cathodoluminescent phosphor coating covers the entire inner surface 20 of face plate 16 as a result of the manufacturing process, and the screen 18 is delineated primarily by the scanning electron beam 22 formed by electron gun 24, which is indicated highly schematically.

The axis 26 of tube 10 shown by FIG. 1 is depicted as being normal to the cathodoluminescent screen 18. It will be noted also that the electron optical axis of electron gun 24 is coincident with tube axis 26 except insofar as beam 22 diverges for scanning screen 18. This type of tubes is provided for operation "on-axis" in a projection television system; that is, in a location where the electron-optical axis of the tube is coincident with the axis of the viewing screen.

Figure 3:
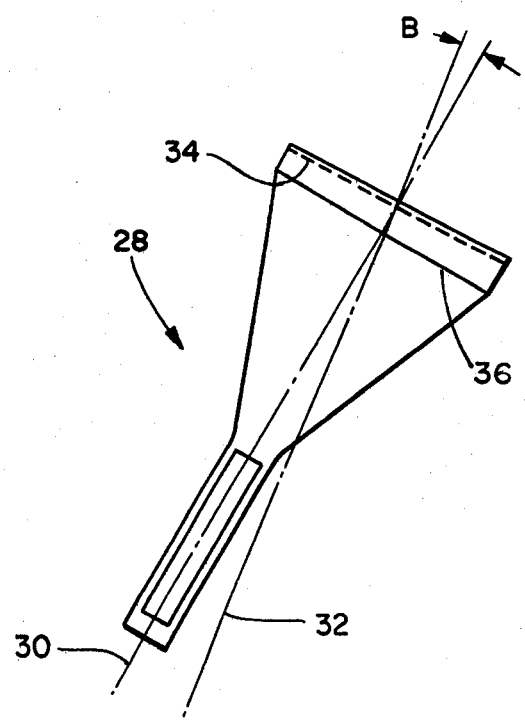
FIG. 3 shows diagramatically a projection cathode ray tube having imaging means compensating for non-linear magnification distortion resulting from an off-the-screen-axis location.

FIG. 3 depicts schematically a cathode ray tube 28 according to the invention described and claimed in U.S. Pat. No. 4,274,110, of common ownership herewith. FIGS. 4 and 5 depict the actual configuration of the tube shown in FIG. 3. Tube 28 is provided for operation "off-axis" in a projection television system; that is, off the axis of the viewing screen. This tube 28 is characterized by the electron-optical axis 30 defining a non-zero, acute angle B with respect to the axis 32 of the cathodoluminescent screen 34. The value of angle B and the orientation of the electron-optical axis 30 is selected to cause the electron-formed visible image that appears on screen 34 to have orientation and non-linear magnification distortion effective to substantially compensate for the off-axis-induced non-linear distortion of the projected light image. Tubes of this type are referred to colloquially as having "tilted" face panels. The seal line 36 will be noted as being oriented at an angle with respect to the screen 34.

The face panels of projection television cathode ray tubes which must operate at very high brightness levels, are subject to thermally induced cracking due to the high temperatures which develop under bombardment of the electron beam. Cooling means according to the invention for cooling the face panel of a projection cathode ray tube are depicted in FIGS. 6 and 7, and in greater detail in FIGS. 8 and 9. The cathode ray tube 10 (shown also by FIGS. 1 and 2) is depicted as having a non-tilted face panel 16 which includes a window section 38. The rearwardly extending flange 17 is indicated as having a forwardly tapering section 40, indicated by the bracket in FIG. 8. The screen 18 has deposited on its inner surface 20 a cathodoluminescent material which provides for forming a television image.

The window section 38 of face panel 16 is depicted as being relatively thick; for example the thickness may be as much as 8 millimeters for a tube of the size described. This thickness provides for adequate shielding against X-ray emissions from the face panel area of the tube. The use of a relatively thick window section is made possible by the cooling efficiency of the cooling means according to the invention. If a less-effective cooling means were used, the window section 38 would have to be made thinner to inhibit thermal cracking. The use of a thinner window section; for example, a thickness of 5 millimeters, would in turn result in greater X-ray emission from the face panel area. To reduce this emission to a safe level, it would be necessary to use a special and expensive glass composition having a high barium content.

The cooling means according to a preferred embodiment of the invention comprises the following components. A housing 42 preferably made from sheet metal is shown as having a rearwardly extending flange 44 with a forwardly tapering section 46 configured to nest with a forwardly tapering section 40 of face panel 16 when mated therewith. Housing 42 has a window section 48 recessed in housing 48 for passing the television image formed on the cathodoluminescent screen 18, which is visible through the window section 38. Housing 42 includes four identical mounting ears 50, indicated as being located in the corner regions of the housing 42 for supporting cathode ray tube 10. Housing 42 is made from stainless steel according to the invention. The metal is preferably type 304, or an equivalent, about 0.030 inch in thickness, by way of example. The housing can be formed by processes such as spinning (for use with tubes having round face panels) and die-forming.

Window section 48 of housing 42 preferably consists of soda lime float glass, type 1, class 1, quality 3 (glaze effect) as per Federal Specification DD-G-451d. Window height is about 3.9 inches, by way of example, and width about 4.3 inches, with a thickness of about 0.125 inch. To enhance contrast and reduce halation, the window section is preferably provided with an anti-reflective coating, which reduces surface reflectivity from 4.6 percent to 0.6 percent. This coating, termed "Invisiglas" TM is provided by Optical Coating Laboratories, Inc., Santa Rosa, Calif. A coating having equivalent properties could as well be used.

Window section 48 of housing 42 is spaced, according to the invention, from the window section 38 of face panel 16 by three discrete spacing means 52. As shown by the enlarged, detail view of FIG. 9, a spacing means 52 is depicted as lying between and spacing apart window section 48, and the window section 38 of face panel 16. A foot 54 projecting from the spacing means aids in retaining spacing means 52 in proper relationship with the window section 48. The location of the three spacing means 52 with respect to the face panel 16 and housing 42 is shown by FIG. 7. Each spacing means 52 is indicated as being restrained from lateral movement by indent-detent means 53, wherein a detent projecting from housing 42 engages an indent in the associated spacing means. The thickness, (ref. No. 54) of the spacing means 52 is about 0.126 inch, by way of example, which provides for an equivalent space between window sections 38 and 48. The material of spacing means 52 preferably comprises Ryton TM R4, which is a polyphenolyne sulfide supplied by Phillips Chemical Co., Houston, Tex. This material has necessary structural stability, and is unaffected by any known solvent at temperatures up to a range of 365-400 degrees Fahrenheit.

Figure 9:
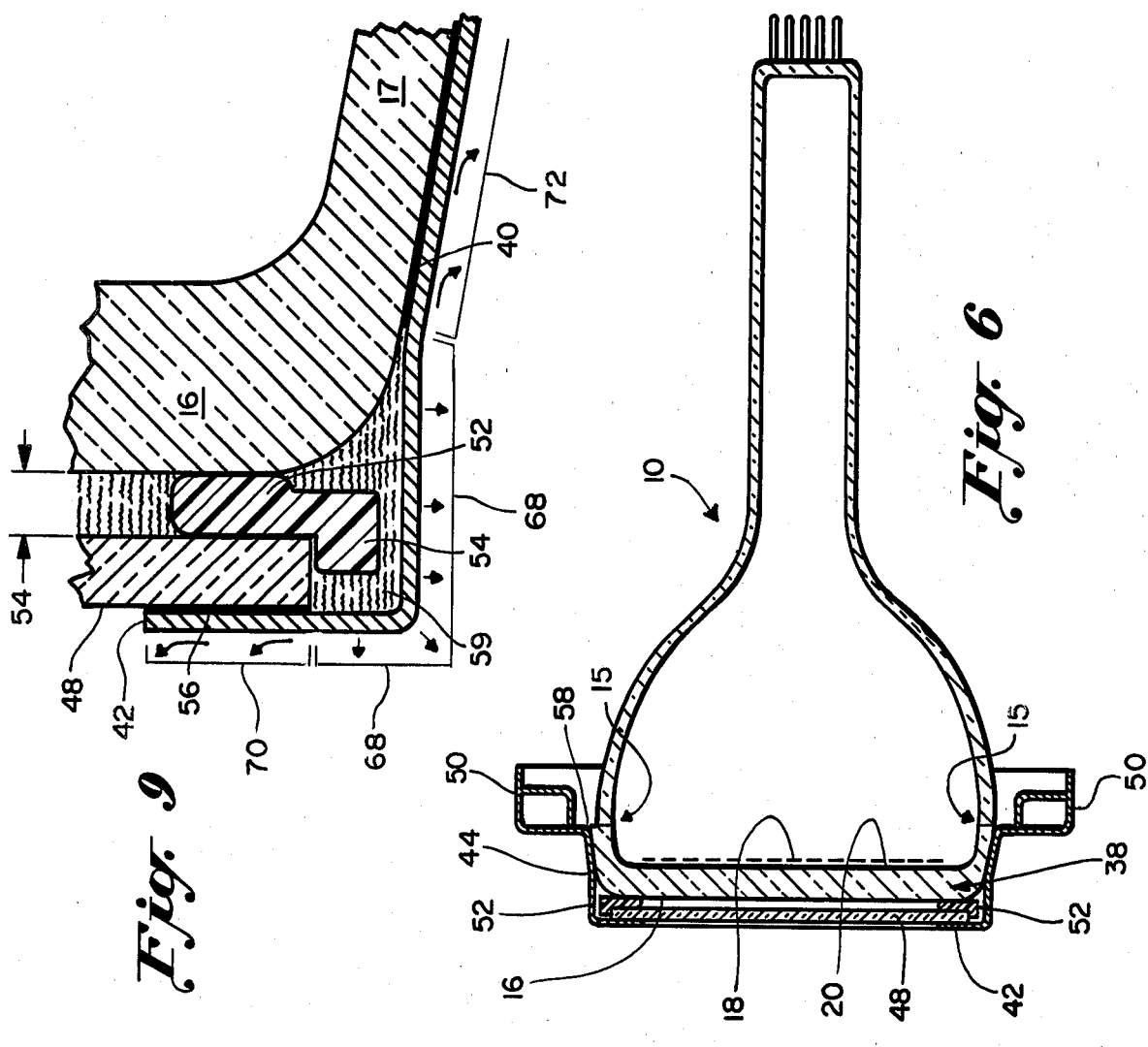
FIG. 9 is an enlarged, detail view in section of a spacer component according to the invention in conjunction with adjacent parts; and, FIG. 10 is a sectioned side view in elevation of the cooling means according to the invention for use with the off-the-screen-axis cathode ray tube shown by FIGS. 3-5.

The use of spacing means 52 according to the invention provides for highly accurate and positive spacing of window section 48 with respect to the cathodoluminescent screen, ensuring parallelism of the plane of the window section with the screen. FIG. 9 also shows that the housing 42 is effective to protect window section 48 from abrasion and scratching as the window section 48 is recessed in the housing 42, and framed thereby. The bonding of window section 48 to housing 42 is also indicated as being by means of a bonding adhesive 56 which may consist of a thermal setting silicone rubber. A preferred adhesive sealant is type 6424 supplied by General Electric; other thermal-setting adhesives with equivalent properties may be used.

Tapering section 40 of flange 17, and tapering section 46 of housing 42 are bonded and sealed at the interface 58 of the two sections, as indicated in FIG. 6. The bonding material can be the thermal-setting silicone rubber described heretofore.

A cooling medium is located in the space between window sections 38 and 48. The medium is preferably a mixture of the anti-freeze ethylene glycol and water, which has a refractive index similar to that of the adjacent window sections 38 and 48. The cooling medium can be injected through an orifice (not shown) in the housing 42 which can then be welded closed, or otherwise stoppered.

The cooling means according to the invention are such that the tapering sections 40 and 46 provide for mechanically attaching the housing 42 and the tube 10 into firm, exact adjacency for sealing, in conjunction with the bonding means, the housing 42 to the face panel 16, and for physically supporting tube 10 in conjunction with the mounting ears 50.

Figure 10:
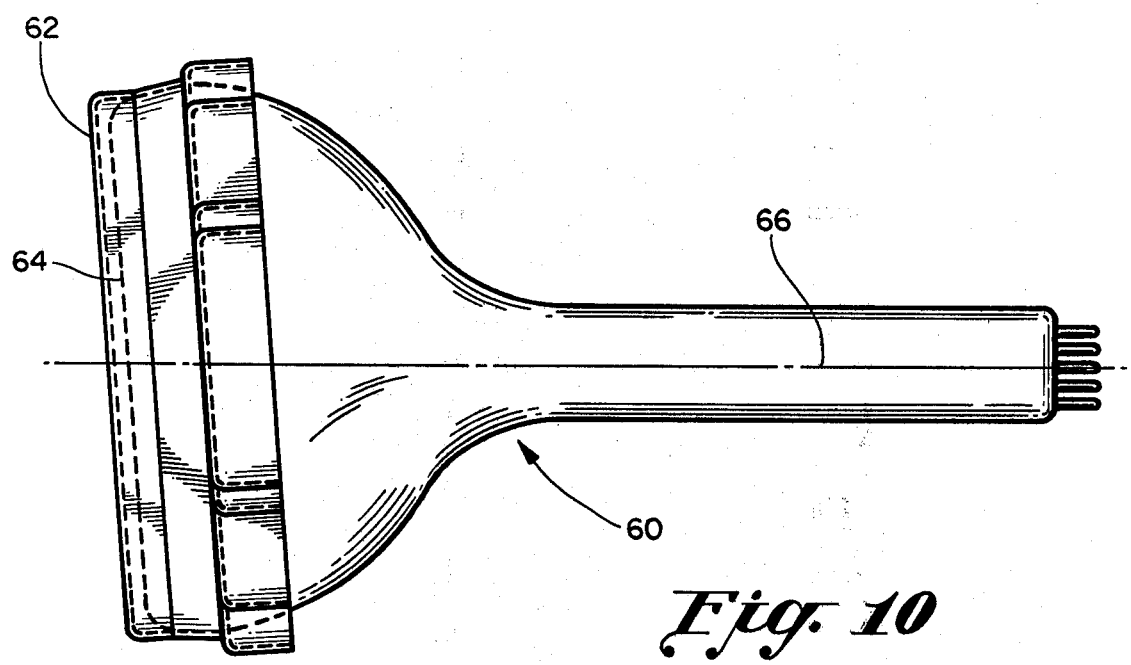

FIG. 10 depicts an off-axis cathode ray tube 60 and its configuration according to the invention described in the referent U.S. Pat. No. 4,274,110, and having cooling means 62 according to the invention. The "tilt" of the face panel 64 with respect to the axis 66 of tube 60 will be noted. No physical modification of housing 62 to adapt to the tilt of face panel 64 is needed. A salient benefit of the cooling means according to the invention is its adaptability to projection tubes such as depicted which have an eccentric configuration.

Other benefits of the cooling system according to the invention are signal and several. For example, the relatively large surface area of the housing 42 permits dissipation of the heat developed in the face panel to the surrounding environment without incurring excessive temperature differentials. Also, because of the positioning of that portion of the housing surface containing the integral ears 50 in a relatively unconfined region of the receiver chassis, convection from the large surface area is further enhanced. As a result, the face panel temperature is lowered by as much as 45 degrees Centigrade. So effective is the cooling means according to the invention in that no conduction of heat to the tube supports is required, so the supporting members contacting the ears 50 can be made of a light plastic in lieu of metal parts of greater weight. By application of the cooling means according to the invention, a projection tube can be operated continuously at 15 watts with a temperature rise no greater than 85 degrees Centigrade. The power handling capability can be increased by as much as 80 percent over the power that can be applied to uncooled projection tubes.

Further with regard to cooling, the free circulation of the liquid cooling medium 59 reduces the stress-inducing temperature differential between the area of the face panel bombarded by the electron beam, and the adjacent areas of the face panel. It will be noted from FIG. 8 and 9 that the cooling medium 59 is able to contact not only virtually the entirety of the face panel 16, but also a substantial part of the corner radius of the flange 17 as well, thereby extending the beneficial cooling effect over a significantly larger area of the tube.

The cooling medium 59 is in direct contact with the metal of the housing 42. The fact that the housing is stainless steel, and not a metal such as aluminum, makes this direct contact possible. The cooling medium, ethylene glycol, has been found to be corrosive with respect to aluminum, making it necessary to coat the inside of the housing with silicone rubber or some other protectorant when aluminum or other corrodable metal is used, thus restricting heat transfer between the coolant and the housing. As a result of the direct contact between the coolant 59 and the metal of the housing 42, in the means according to the invention heat transfer is optimized.

Face panel cooling efficiency of the means according to the invention is enhanced by the fact that the cooling medium 59 is in direct contact with large areas of the housing 42, which in turn are in direct contact with the surrounding air. These areas may be termed "primary cooling areas"; one such area 68 is indicated by the bracket in FIG. 9, and the outwardly flow of heat to the environment is indicated by the associated arrows. Secondary cooling areas provide a lesser, but appreciable, measure of cooling; these are the areas of the housing 42 that are not in direct contact with the cooling medium 59. Two such secondary areas 70 and 72 are indicated in FIG. 6, with a direction of heat flow through the metal of the housing 42 and to the surrounding environment depicted by the associated arrows.

Another benefit is derived from the direct contact between the cooling medium 59 with the metal of the housing lies in the fact that the housing 42 can be grounded, in effect grounding the cooling medium (which is slightly electrically conductive) and the tube itself. This grounding effectively prevents dust-attracting image-obscuring build up of a static charge on the outer surface of the window section 48, and the heat-transfer-inhibiting collection of dust on the housing and the tube.

A further benefit is that of enhanced X-ray shielding. It will be noted from FIG. 6 that the rearwardly extending flange of the housing 42 effectively covers the seal line 15 between the face panel flange and the funnel, and thus provides a shield against X-radiation from the seal line, which is responsible for passing most of the X-radiation from the tube. It is notable also that the stainless steel of the housing 42 is an effective X-radiation barrier, one superior to metal such as aluminum.

While particular embodiments of the invention have been shown and described, it will be obvious to those skilled in the art that changes and modifications may be made without departing from the invention in its broader aspects, and therefore, the aim of the appended claims is to cover all such changes and modifications as fall within the true spirit and scope of the invention.

We claim:

1. Cooling means for cooling the face panel of a projection cathode ray tube, said face panel including a window section and a rearwardly extending flange having a forwardly tapering section, and a cathodoluminescent screen on the inner surface thereof for forming a television image, said cooling means comprising:
   a housing having a rearwardly extending flange with a forwardly tapering section configured to nest with the forwardly tapering section of the face panel when mated therewith, said housing having a window section for framing and passing said image, and including tube mounting ears in the corner regions thereof for supporting said cathode ray tube;
   spacing means for spacing said window section of said housing from said face panel window section
   bonding means for bonding and sealing said tapering sections together;
   a cooling medium located in the space between said windows for cooling the entirety said face panel;
   such that said tapering sections provide for mechanically attaching said housing and said tube into firm exact adjacency for sealing, in conjunction with said bonding means, said housing to said face panel, and for physically supporting said tube in conjunction with said mounting ears.

2. Cooling means according to claim 1 wherein said face panel is round.

3. Cooling means according to claim 1 wherein said face panel is rectangular.

4. Cooling means for cooling the face panel of a rectangular projection cathode ray tube, said tube having a funnel joined to said face panel at a seal line, said face panel including a window section and a rearwardly extending flange having a forwardly tapering section, and a cathodoluminescent screen on the inner surface thereof for forming a television image, said cooling means comprising:
   a stainless steel, sheet-metal housing having a rearwardly extending flange for covering said seal line, and a forwardly tapering section configured to nest with the forwardly tapering section of the face panel when mated therewith, said housing having a window section recessed in said housing for passing said image, and including mounting ears in the corner regions for supporting said cathode ray tube;
   spacing means for spacing said window section of said housing from said face panel window section;
   bonding means for bonding sealing said tapering sections together;
   a cooling medium located in the space between said windows for cooling the entirety of said face panel;
   such that said tapering sections provide for mechanically attaching said housing and said tube into firm exact adjacency for sealing, in conjunction with said bonding means, said housing to said face panel; and for physically supporting said tube in conjunction with said mounting ears; and said rearwardly extending flange provides for shielding against X-radiation from said seal line.

* * * * *